(12) United States Patent
Liu et al.

(10) Patent No.: US 10,176,843 B2
(45) Date of Patent: Jan. 8, 2019

(54) DETECTION OF Z-AXIS NON-OPERATION SHOCK

(71) Applicant: SEAGATE TECHNOLOGY LLC, Cupertino, CA (US)

(72) Inventors: Xiong Liu, Singapore (SG); MingZhong Ding, Singapore (SG); ChuenBuan Lee, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/883,934

(22) Filed: Jan. 30, 2018

(65) Prior Publication Data

US 2018/0158483 A1 Jun. 7, 2018

Related U.S. Application Data

(63) Continuation of application No. 15/348,409, filed on Nov. 10, 2016, now Pat. No. 9,916,858.

(51) Int. Cl.
*G11B 5/596* (2006.01)
*G11B 20/18* (2006.01)
*G11B 5/39* (2006.01)

(52) U.S. Cl.
CPC ........... *G11B 20/1816* (2013.01); *G11B 5/39* (2013.01)

(58) Field of Classification Search
None
See application file for complete search history.

(56) References Cited

U.S. PATENT DOCUMENTS

| 9,117,471 B1 | 8/2015 | Liu et al. |
| 9,159,369 B1 | 10/2015 | Liu et al. |
| 2011/0051286 A1* | 3/2011 | Pokharel ............... B82Y 10/00 360/131 |
| 2013/0114162 A1 | 5/2013 | Zhang et al. |

* cited by examiner

*Primary Examiner* — K. Wong
(74) *Attorney, Agent, or Firm* — Holland & Hart LLP

(57) ABSTRACT

Systems and methods for determining an occurrence of non-operation shock (NOS) in a disc drive are described. Such determining may be used to determine whether or not the disc drive should be recalibrated or compensated to account for changes induced by NOS. Determining NOS may be based at least in part on a harmonic of the spindle of the disc drive other than the first harmonic, such as a third harmonic of the spindle. In some embodiments, determining NOS may be based on the first harmonic of the spindle and at least one other harmonic of the spindle.

20 Claims, 4 Drawing Sheets

DETECTION OF Z-AXIS NON-OPERATION SHOCK

RELATED APPLICATIONS

This application is a continuation of U.S. patent application Ser. No. 15/348,409, filed on 10 Nov. 2016 and entitled DETECTION OF Z-AXIS NON-OPERATION SHOCK, now U.S. Pat. No. 9,916,858, issued on 13 Mar. 2018, the disclosure of which is incorporated in its entirety by this reference.

SUMMARY

The present disclosure is directed to methods and systems for detecting or otherwise determining an occurrence of non-operation shock (NOS) in a disc drive. In some embodiments, the present systems and methods may determine the occurrence of NOS based at least in part on a harmonic of the spindle of the disc drive.

A storage device is described. In one embodiment, the storage device may include a data storage medium comprising at least one disc, at least one magnetoresistive (MR) read/write head associated with the at least one disc rotatably supported by a spindle, and a non-operating shock (NOS) detector to determine an occurrence of NOS based at least in part on a change in vector of at least one harmonic of the spindle other than a first harmonic.

In some embodiments, the NOS detector may determine the occurrence of NOS based at least in part on the change in vector of the at least one harmonic of the spindle other than the first harmonic and a change in vector of the first harmonic of the spindle.

In some embodiments, the NOS detector may determine the occurrence of NOS based at least in part on the change in vector of a second harmonic of the spindle. In other embodiments, the NOS detector may determine the occurrence of NOS based at least in part on the change in vector of a third harmonic of the spindle. In other embodiments, the NOS detector may determine the occurrence of NOS based at least in part on the change in vector of a twelfth harmonic of the spindle.

A method is also described. In one embodiment, the method may include determining a vector of a third harmonic of a spindle of the disc drive, comparing the determined vector to a stored vector of the third harmonic of the spindle to determine a first vector change, and determining an occurrence of NOS based at least in part on the determined first vector change.

In some embodiments, determining the occurrence of NOS based at least in part on the determined first vector change determines the occurrence of NOS in an axial direction of the spindle. In some embodiments, determining the occurrence of NOS based at least in part on the determined first vector change determines the occurrence of NOS associated with a disc clamp that secures at least one disc of the disc drive to the spindle.

In some embodiments, the method includes determining a vector of a first harmonic of the spindle of the disc drive, and comparing the determined vector of the first harmonic to a stored vector of the first harmonic of the spindle to determine a second vector change. In such embodiments, determining the occurrence of NOS is based at least in part on the determined first vector change and the determined second vector change.

In some embodiments, the determined first vector change is a change in magnitude, a change in phase, or a change in both magnitude and phase.

In some embodiments, the method includes calculating a change in a magneto-resistive (MR) jog offset for a read/write head associated with a disc that is associated with the spindle based at least in part on the determined first vector change.

A non-transitory computer-readable medium is also described. In some embodiments, the medium has processor-executable instructions stored thereon that, when executed by a processor operably connected to a storage device, cause the processor to determine a vector of a harmonic of a spindle of the storage device other than a first harmonic, compare the determined vector to a stored vector of the harmonic of the spindle to determine a first vector change, and determine an occurrence of NOS based at least in part on the determined first vector change.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to determining an occurrence of non-operation shock (NOS) in a disc drive, such as a Hard Disc Drive (HDD). A disc drive typically includes one or more read/write heads that are driven relative to a storage medium to write data to and read data from the medium. During production of a disc drive, once the drive has been assembled, an MR jog offset will be calibrated for the drive, for example, during a certification process (e.g., CERT testing). For each read-write head of the disc drive, a set of polynomial coefficients, $a_0, a_1, a_2 \ldots, a_n$, are determined and saved, for example, to non-volatile storage. For a given track x on a particular disc, the MR jog offset $D(x)$ for the associated head is obtained as follows:

$$D(x) = a_0 x^n + a_1 x^{n-1} + \ldots + a_n$$

After certification, however, the MR jog offset may incur DC shift or drift. DC shift may occur, for example, as a result of NOS to the disc drive. For a mobile drive, a typical NOS specification is 1000G @ 2 ms. When a disc drive is subjected to such a high G level shock, certain mechanical components will be shifted or drifted. Note that the description herein uses the term drift to encompass both drift and shift. NOS may cause various component drifts, such as MR jog offset drift, fly height shift, etc.

Regardless of the cause of the drift, some power-on recalibration may be needed after a disc drive experiences NOS to account for change (e.g., disc slip, fly height shift, etc.) caused by the NOS. In one embodiment, the present disclosure describes an efficient method to detect or otherwise determine an occurrence of NOS for which recalibration or other compensation is needed. However, because such recalibration/compensation may induce longer time-to-ready (TTR), correctly determining whether the disc drive has experienced NOS such that the disc drive needs to be recalibrated may yield better drive performance.

As further described herein, determining an occurrence of NOS in a disc drive may be based at least in part on a change in vector of at least one harmonic of the spindle other than a first harmonic. In some embodiments, the at least one harmonic is a second harmonic of the spindle, a third harmonic of the spindle, and/or a twelfth harmonic of the spindle. In some embodiments, determining the occurrence of NOS is based at least in part on a change in vector of the first harmonic of the spindle in addition to the change in vector of the at least one harmonic. The approaches described herein may reduce potential misclassification of NOS, thereby reducing unnecessary recalibration of the disc drive. Also, the approaches described herein may reduce potential non-detection of NOS that has occurred.

Figure 1:
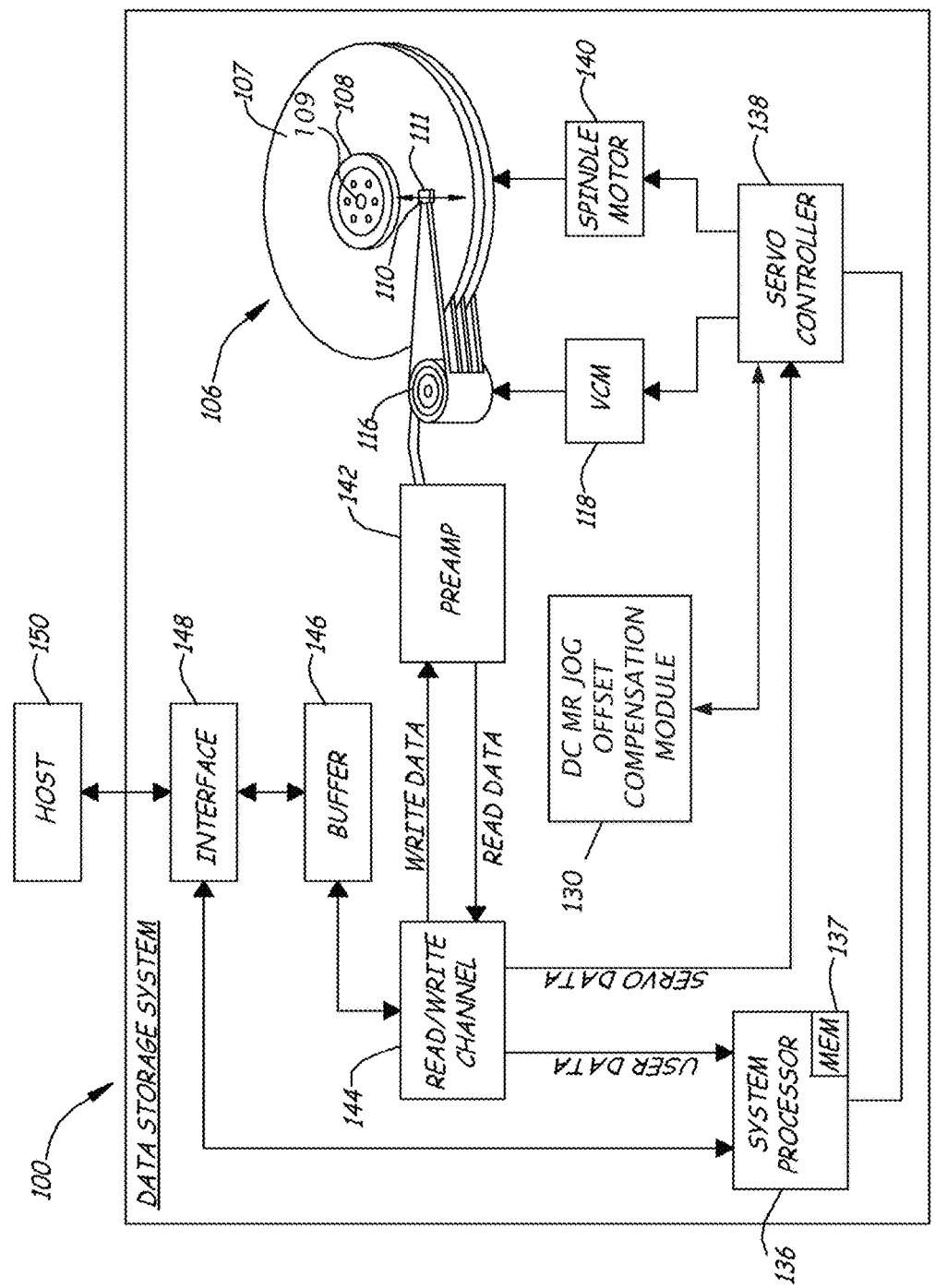
FIG. 1 is a block diagram of an example of a system in accordance with various embodiments.

FIG. 1 is a block diagram illustrating one embodiment of a data storage system 100 (e.g., a disc drive system) in which the present systems and methods may be implemented. The data storage system 100 includes media 106, such as a plurality of discs 107, which are rotatably mounted to a spindle 108 by a clamp 109 (also may be referred to as a spindle component or the spindle itself). Each surface of the media 106 has an associated slider 110, which carries a read/write head 111 for communication with the media surface. Sliders 110 are supported by suspensions and track accessing arms of an actuator mechanism 116. For example, the actuator mechanism 116 can be of the type known as a rotary moving coil actuator and includes a voice coil motor (VCM) 118. The VCM 118 rotates actuator mechanism 116 about a pivot shaft to position sliders 110 over a desired data track along an arcuate path between an inner diameter (ID) and an outer diameter (OD) of respective discs 107. The VCM 118 is driven by electronic circuitry based on signals generated by the read/write heads 111 and a servo controller 138.

As previously discussed, media 106 can include a plurality of discs 107. Each disc 107 has a plurality of substantially concentric circular tracks. Each track is subdivided into a plurality of storage segments. As defined herein, a storage segment is the basic unit of data storage in media 106. Each storage segment is identified and located at various positions on media 106. In the disc-type media example, storage segments or data sectors are "pie-shaped" angular sections of a track that are bounded on two sides by radii of the disc and on the other side by the perimeter of the circle that defines the track. Each track has related logical block addressing (LBA). LBA includes a cylinder address, head address and sector address. A cylinder identifies a set of specific tracks on the disc surface to each disc 107 which lie at equal radii and are generally simultaneously accessible by the collection of read/write heads 111. The head address identifies which head can read the data and therefore identifies which disc from the plurality of discs 107 the data is located. As mentioned above, each track within a cylinder is further divided into sectors for storing data and servo information. The data sector is identified by an associated sector address.

The data storage system 100 includes a system processor 136, which is used for controlling certain operations of data storage system 100 in a known manner. The various operations of data storage system 100 are controlled by system processor 136 (e.g., storage controller) with the use of programming and/or instructions stored in a memory 137. The data storage system 100 also includes a servo controller 138, which generates control signals applied to the VCM 118 and spindle motor 140 (as well as the microcontroller, not shown). The system processor 136 instructs the servo controller 138 to seek read/write head 111 to desired tracks. The servo controller 138 is also responsive to servo data, such as servo burst information recorded on disc 107.

The data storage system 100 further includes a preamplifier (preamp) 142 for generating a write signal applied to a particular read/write head 111 during a write operation, and for amplifying a read signal emanating from a particular read/write head 111 during a read operation. A read/write channel 144 receives data from the system processor 136, via a buffer 146, during a write operation, and provides encoded write data to the preamplifier 142. During a read operation, the read/write channel 146 processes a read signal generated by the preamplifier 142 in order to detect and decode data recorded on the discs 107. The decoded data is provided to the system processor 136 and ultimately through an interface 148 to a host computer 150.

In some configurations, the data storage system 100 may include a DC drift compensator, such as a DC MR jog offset compensation module 130. Although DC MR jog offset compensation module 130 is shown in this example, it should be understood that any suitable module(s) for recalibrating and/or compensating for NOS-induced changes may be employed. For example, a head fly height recalibration module (not shown) may be included to recalibrate the fly height of read/write heads 111 (e.g., adjust an amount of heater DAC applied to avoid weak write, which may occur when performing a write operation at an increased fly height, or head burnish, which may occur when performing a write operation at a decreased fly height).

In one example, the data storage system 100 may be a component of a host (e.g., operating system, host hardware system, etc.). The DC MR jog offset compensation module 130 may compensate for DC drift of the read/write heads 111, for example, by feedforward of a correction factor during write operation to maintain the writer at the original written-in data center, or by migrating data using shingled magnetic recording (SMR) band rewrite operations, such as described in U.S. patent application Ser. No. 15/170,589, filed Jun. 1, 2016, the entirety of which is incorporated herein by reference. Although not shown, the DC MR jog offset compensation module 130 may include a NOS determination module, a DC drift determination module and a DC drift compensator module as described in the afore-mentioned patent application. The DC drift determination module may determine an amount of DC drift incurred by each MR read/write head (or slider) in the disc drive. Once the DC drift amount has been determined for each slider/head of the disc drive, the DC drift compensator module may determine a correction factor or MR jog offset adjustment value for compensating the positioning of each slider/head for future read/write operations. The correction profile is then accessed for read/write commands (according to the particular disc to be read from/written to) to properly position the appropriate slider/head. The DC drift compensator module may use the correction profile in any suitable manner to compensate for the DC shift, for example, to avoid data encroachment on adjacent tracks. For example, the DC drift compensator module may adjust the positioning of the read head during write operations by feedforward of a correction factor/offset adjustment value into the servo position set point. In such a manner, the write head is positioned to the original (pre-drift/pre-NOS) position for a given track.

One approach to determining an occurrence of NOS uses a magnitude change of a first harmonic of the spindle or 1×ACFF (alternating current feed-forward). While this approach may be effective when the disc drive is subjected to either X-axis or Y-axis (disc plane) NOS, the first harmonic of the spindle or 1×ACFF is not sufficiently significant to detect an occurrence of NOS when the disc drive is subjected only to Z-axis (spindle axis) NOS (or NOS associated with the disc clamp). Another potential problem with this approach is the repeatability resolution of the first harmonic or 1×ACFF measurement.

Table 1 (below) illustrates potential misclassification of NOS and potential non-detection of NOS that may occur when the first harmonic or 1×ACFF is used for detecting NOS in various disc drive models (using a servo count limit of twenty-five, a track pitch of 256 servo count, and NOS of 1000 Gs). For each model, a difference between two measurements of 1×ACFF and a measured change in 1×ACFF after NOS is listed in Table 1. The mean and standard deviation for all models is also shown in Table 1. Finally, the overall potential of misclassification of NOS due to measurement error and the overall potential of not detecting NOS are also shown in Table 1. As shown in this example, there is a thirty-five percent chance of misclassification, and resulting unnecessary recalibration, when the first harmonic or 1×ACFF is used. Also, there is a six percent chance that NOS is not detected, and needed recalibration is not performed, when the first harmonic or 1×ACFF is used.

TABLE 1

|  | Difference between measurements | Change after NOS |
|---|---|---|
| Model A | 19.21 | 71.06 |
| Model B | 24.87 | 347.67 |
| Model C | 14.50 | 260.35 |
| Model D | 28.58 | 161.71 |
| Model E | 26.69 | 40.08 |
| Mean | 22.77 | 176.17 |

TABLE 1-continued

|  | Difference between measurements | Change after NOS |
|---|---|---|
| Standard Deviation | 5.80 | 128.72 |
| Misclassification | 35.0% |  |
| Non-detection |  | 6.1% |

Table 2 (below) illustrates potential misclassification of NOS and potential non-detection of NOS that may occur when a third harmonic of the spindle is used in combination with the first harmonic for detecting NOS in the same disc drive models (using a servo count limit of twenty-five for the first harmonic and a servo count limit of ten for the third harmonic). For each model, a difference between two measurements of the first harmonic, a difference between two measurements of the third harmonic, a measured change in the first harmonic after NOS, and a measured change in the third harmonic after NOS is listed in Table 2. The mean and standard deviation for all models is also shown in Table 2. Finally, the overall potential of misclassification of NOS due to measurement error and the overall potential of not detecting NOS are also shown in Table 2. As shown in this example, there is a one percent chance of misclassification when the third harmonic is used, as compared to thirty-five percent when only the first harmonic is used. Also, there is less than one percent chance that NOS is not detected when the third harmonic is used, as compared to six percent when only the first harmonic is used.

TABLE 2

|  | Difference between measurements of first harmonic | Difference between measurements of third harmonic | Change in first harmonic after NOS | Change in third harmonic after NOS |
|---|---|---|---|---|
| Model A | 19.21 | 2.05 | 71.06 | 17.73 |
| Model B | 24.87 | 4.19 | 347.67 | 43.18 |
| Model C | 14.50 | 2.46 | 260.35 | 40.36 |
| Model D | 28.58 | 7.43 | 161.71 | 11.40 |
| Model E | 26.69 | 1.89 | 40.08 | 15.07 |
| Mean | 22.77 | 3.60 | 176.17 | 25.55 |
| Standard Deviation | 5.80 | 2.33 | 128.72 | 15.01 |
| Misclassification | 35.0% | 2.9% |  |  |
| Non-detection |  |  | 6.1% | 10.8% |
| Combined misclassification | 1.0% |  |  |  |
| Combined non-detection |  |  | 0.7% |  |

In general, the harmonic other than the first harmonic that is used for NOS detection may be selected to determine NOS occurrence in an axial direction of the spindle. Alternatively or additionally, the harmonic other than the first harmonic that is used for NOS detection may be associated with the disc clamp. The disc clamp may be significantly affected by NOS, especially NOS along the spindle axis. For example, a change in the disc clamp caused by NOS will induce a significant change in the third harmonic of the spindle. Thus, as in the example of Table 2, the third harmonic may be used to detect spindle-axis (e.g., Z-axis) NOS.

Figure 2:
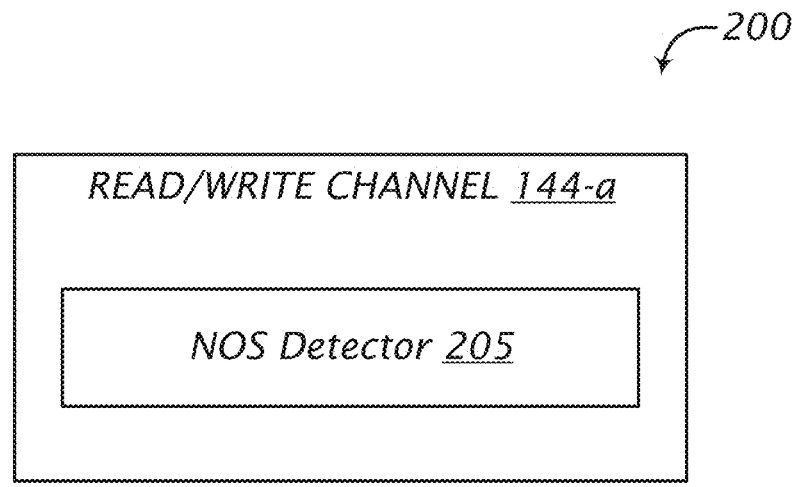
FIG. 2 shows a block diagram of an example of a read/write channel in accordance with various aspects of this disclosure.

FIG. 2 shows a block diagram 200 of a read/write channel 144-a. The read/write channel 144-a includes a NOS detector 205. The NOS detector 205 may be implemented using one or more harmonic sensors, for example, such as described in U.S. Pat. No. 9,159,369, the entirety of which is incorporated herein by reference. For example, the NOS detector 205 may include a harmonic sensor configured to detect the vector of the read signal at the frequency of the third harmonic of the spindle. The NOS detector 205 may include another harmonic sensor configured to detect the vector of the read signal at the frequency of the first harmonic of the spindle.

Although shown as part of the read/write channel 144-*a*, it should be understood that the NOS detector 205 may be a separate component that is in communication with the read/write channel 144-*a*. Further, although not shown, it should be understood that the NOS detector 205 may include a processor or may be in communication with a separate processor, such as the system processor 136 of FIG. 1. Such processor may determine recalibration/compensation for the data storage system 100 based at least in part on a vector change in the harmonic(s) of the spindle (e.g., using a transfer function determined for the data storage system 100). For example, the processor may calculate a change in a magneto-resistive (MR) jog offset for the read/write head 111 associated with a particular disc 107 based at least in part on the determined vector change.

As described herein, the NOS detector 205 is configured to determine when an NOS has occurred. Determination of a NOS occurrence may be used to determine when to proceed with recalibration or compensation, such as DC drift determination and compensation, fly height recalibration, etc. Thus, by improving NOS detection as described herein, unnecessary recalibration/compensation may be reduced.

One or more of the components of the read/write channel 144-*a* and/or the NOS detector 205, individually or collectively, may be implemented using one or more application-specific integrated circuits (ASICs) adapted to perform some or all of the applicable functions in hardware. Alternatively, the functions may be performed by one or more other processing units (or cores), one or more integrated circuits, or combinations thereof. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 3:
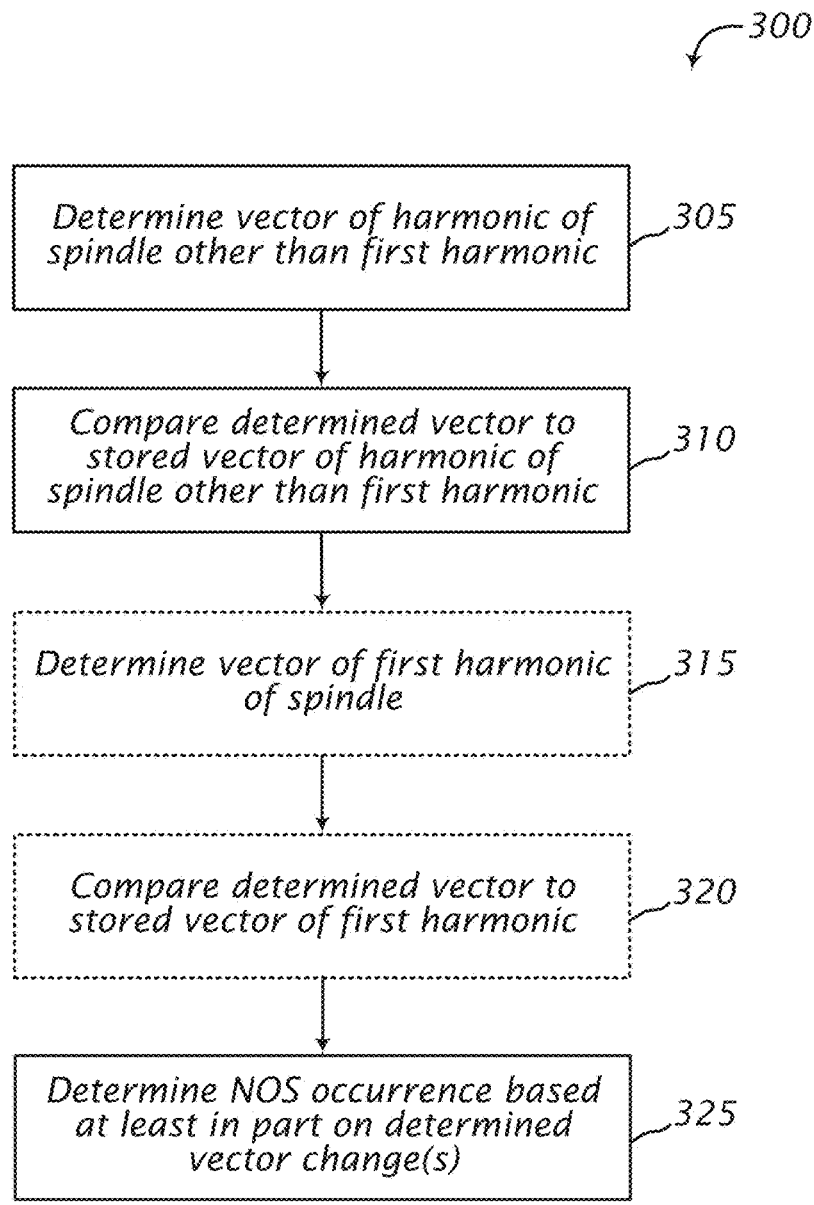
FIG. 3 is a flow chart illustrating an example of a method in accordance with various aspects of this disclosure.

FIG. 3 is a flow chart illustrating an example of a method 300 for determining an occurrence of NOS in a disc drive, in accordance with various aspects of the present disclosure. One or more aspects of the method 300 may be implemented in conjunction with the data storage system 100 of FIG. 1 and/or the read/write channel 144-*a* of FIG. 2. In some examples, a storage device may execute one or more sets of codes to control the functional elements of the storage device to perform one or more of the functions described below. Additionally or alternatively, the storage device may perform one or more of the functions described below using special-purpose hardware.

At block 305, the method 300 may include determining a vector of a harmonic of a spindle of the disc drive other than the first harmonic. As described herein, the harmonic other than the first harmonic may be a second harmonic, a third harmonic and/or a twelfth harmonic. Determining the harmonic at block 305 may be performed in any suitable manner, such as described above with reference to FIG. 2.

At block 310, the method 300 may include comparing the vector (magnitude and/or phase) of the harmonic determined at block 305 to a corresponding stored vector (magnitude and/or phase). It may be desirable to update the stored vector only when NOS is determined to have occurred that is sufficient to require recalibration/compensation of the disc drive. That way, a cumulative change in vector may be recognized in case of multiple occurrences of NOS that individually would not cause sufficient changes in vector (changes in magnitude and/or phase) that would indicate recalibration/compensation is needed.

At block 315, the method 300 may include determining a vector of the first harmonic of the spindle of the disc drive. Determining the first harmonic at block 315 may be performed in any suitable manner, such as described above with reference to FIG. 2. Then, at block 320, the method may include comparing the vector (magnitude and/or phase) of the first harmonic to a corresponding stored vector (magnitude and/or phase) of the first harmonic. As described above with respect to block 310, the stored vector of the first harmonic may be previously determined, for example, as an initial measurement or as the vector determined for a most recent recalibration/compensation of the disc drive resulting from detected NOS.

As illustrated by the dotted lines of blocks 315 and 320, such operations may be optional.

Then at block 325, the method 300 may include determining whether or not NOS has occurred based at least in part on the vector change determined at block 310. An occurrence of NOS for which recalibration/compensation of the disc drive is needed may be determined, for example, by comparing the determined vector change to a threshold value. If the operations at blocks 315 and 320 are performed for the method 300, then determining at block 325 whether or not NOS has occurred may be based on both the vector change determined at block 310 and the vector change determined at block 320. As noted herein, the vector change(s) may be in the magnitude of the vector, in the phase of the vector, or in both. As appropriate or desired, separate thresholds for changes in magnitude and changes in phase may be employed. Alternatively, a single threshold for combined changes in magnitude and phase may be employed.

Magnitude may be in terms of tracks and phase may be in terms of degrees relative to the servo sector zero (0), for example. If a vector of a harmonic initially has a magnitude of 500 tracks and a phase of 60 degrees, and has a magnitude of 500 tracks and a phase of 240 degrees after NOS, the phase of the vector has changed by 180 degrees, which corresponds to a disc slip of around 100 tracks. Thus, it may be desirable to take into account changes in both magnitude and phase of the vector.

In some cases, the method 300 may end with the operation(s) at block 325. For example, if the vector change(s) is/are zero (or insufficient to indicate that recalibration/compensation is needed), then the method 300 may end without further operations. The method 300 may be performed each time that the disc drive is powered on (e.g., at startup), or periodically, as appropriate or desired. It should be noted that the method 300 is just one implementation and that the operations of the method 300 may be rearranged, omitted, and/or otherwise modified such that other implementations are possible and contemplated.

Figure 4:
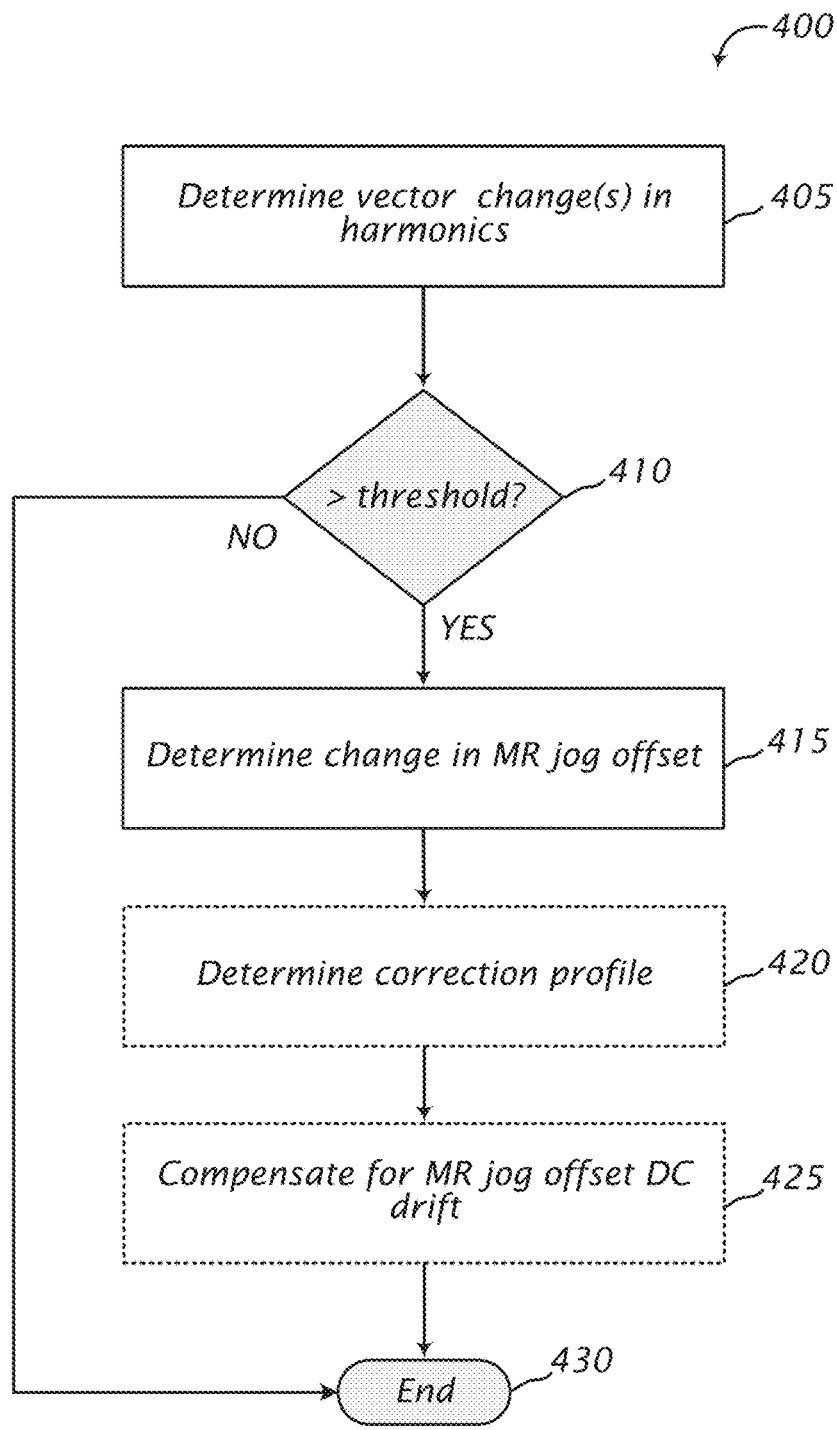
FIG. 4 is a flow chart illustrating an example of another method in accordance with various aspects of this disclosure.

FIG. 4 is a flow chart illustrating an example of a method 400 for recalibration/compensation in a disc drive, in accordance with various aspects of the present disclosure. More specifically, the method 400 may be employed to implement particular approaches described herein. One or more aspects of the method 400 may be implemented in conjunction with the data storage system 100 of FIG. 1 and/or the read/write channel 144-*a* of FIG. 2. In some examples, a storage device may execute one or more sets of codes to control the functional elements of the storage device to perform one or more of the functions described below. Additionally or alternatively, the storage device may perform one or more of the functions described below using special-purpose hardware.

At block 405, the method 400 may include determining a vector change in one or more harmonics of the spindle of the disc drive. The operation(s) at block 405 may be performed such as described above with reference to FIG. 3. Then, at block 410, a determination may be made as to whether the vector change(s) is/are greater than a threshold(s). The determination at block 410 may be performed, for example, by a processor of the disc drive accessing the threshold(s) from memory and making a comparison(s).

If the vector change(s) is/are not greater than the threshold(s), the method may jump to block 430 where the method may end. Otherwise, the method may continue to block 415.

At block 415, the method 400 may include determining a change in MR jog offset (e.g., an MR jog offset DC drift amount). The operation(s) at block 415 may involve performing any suitable technique, either currently known or hereafter developed, such as described above.

Next at block 420, the method 400 may include determining a correction profile for multiple sliders/heads of the disc drive. For example, the operation(s) at block 420 may involve obtaining multiple offset values for each slider/head from performance of the operation(s) at block 415 on a per track basis. In other words, a correction profile may be obtained for each head, with the correction value being calculated on a per track basis. Once determined, the correction profile can be stored locally at the disc drive.

Then at block 425, the method 400 may include compensating for MR jog offset DC drift. For example, the operation(s) at block 425 may involve performing either of the BER or the VGA approaches described in U.S. patent application Ser. No. 15/170,589, incorporated by reference above. The method may then end at block 430.

As illustrated by the dotted lines of blocks 420 and 425, such operations may be optional. In some cases, the method 400 may jump to block 430 upon completion of the operation(s) at block 415. For example, if no write operations occur after the NOS and before a subsequent NOS, no compensation for the MR jog offset drift may be performed (e.g., in the case of the feedforward correction approach discussed above). In the case of the SMR BRO approach discussed above, proactive correction of original data may be performed, with or without write operations occurring after the NOS and before a subsequent NOS.

The operations at blocks 415-425 may be performed using the DC MR jog offset compensation module 130 described with reference to FIG. 1 and/or another module. Thus, the method 400 may provide for DC MR jog offset compensation in a disc drive that experiences DC drift due to NOS, for example. It should be noted that the method 400 is just one implementation and that the operations of the method 400 may be rearranged, omitted, and/or otherwise modified such that other implementations are possible and contemplated.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disc storage, magnetic disc storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave, or any combination thereof, are included in the definition of medium. Disc, as used herein, include compact disc (CD), laser disc, optical disc, digital versatile disc (DVD), floppy disc and Blu-ray disc where discs usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for determining an occurrence of non-operating shock (NOS) in a disk drive, comprising:
   determining a vector of a harmonic other than a first harmonic of a spindle of the disk drive;
   comparing the determined vector to a stored vector of the harmonic other than the first harmonic to determine a first vector change;
   comparing the first vector change to a threshold; and
   upon determining the first vector change satisfies the threshold, calculating a change in a magneto-resistive (MR) jog offset for a read/write head of the disk drive.

2. The method of claim 1, further comprising:
   determining a correction profile based at least in part on the calculated change in MR jog offset for the read/write head.

3. The method of claim 2, further comprising:
   compensating for MR jog offset direct current (DC) drift based at least in part on the determined correction profile.

4. The method of claim 1, further comprising:
   determining an occurrence of NOS based at least in part on the determined first vector change.

5. The method of claim 4, wherein determining the occurrence of NOS based at least in part on the determined first vector change determines the occurrence of NOS in an axial direction of the spindle.

6. The method of claim 4, wherein determining the occurrence of NOS based at least in part on the determined first vector change determines the occurrence of NOS associated with a disk clamp that secures at least one disk of the disk drive to the spindle.

7. The method of claim 4, further comprising:
   determining a vector of the first harmonic of the spindle of the disk drive; and
   comparing the determined vector of the first harmonic to a stored vector of the first harmonic of the spindle to determine a second vector change;
   determining the occurrence of NOS being based at least in part on the determined first vector change and the determined second vector change.

8. The method of claim 7, determining the occurrence of NOS based at least in part on the determined first vector change and the determined second vector change determines the occurrence of NOS in an axial direction of the spindle.

9. The method of claim 7, determining the occurrence of NOS based at least in part on the determined first vector change and the determined second vector change determines the occurrence of NOS associated with a disk clamp that secures at least one disk of the disk drive to the spindle.

10. The method of claim 1, wherein the determined first vector change is a change in magnitude, a change in phase, or a change in both magnitude and phase.

11. A storage device, comprising:
    a data storage medium comprising at least one disk rotatably supported by a spindle; and
    a magnetoresistive (MR) jog offset compensator to determine a vector of a harmonic other than a first harmonic of the spindle; compare the determined vector to a stored vector of the harmonic other than the first harmonic to determine a first vector change; compare the first vector change to a threshold; and upon determining the first vector change satisfies the threshold, calculate a change in MR jog offset for a read/write head of the storage drive.

12. The storage device of claim 11, the MR jog offset compensator to determine a correction profile based at least in part on the calculated change in MR jog offset for the read/write head.

13. The storage device of claim 12, the MR jog offset compensator to compensate for MR jog offset direct current (DC) drift based at least in part on the determined correction profile.

14. The storage device of claim 11, further comprising a non-operating shock (NOS) detector to determine an occurrence of NOS based at least in part on a change in vector of at least one harmonic of the spindle other than a first harmonic.

15. The storage device of claim 14, the NOS detector to determine the occurrence of NOS based at least in part on the change in vector of the at least one harmonic of the spindle other than the first harmonic and a change in vector of the first harmonic of the spindle.

16. The storage device of claim 14, the NOS detector to determine the occurrence of NOS based at least in part on the change in vector of a second harmonic of the spindle.

17. The storage device of claim 16, the NOS detector to determine the occurrence of NOS based at least in part on the change in vector of the second harmonic of the spindle and a change in vector of the first harmonic of the spindle.

18. The storage device of claim 14, the NOS detector to determine the occurrence of NOS based at least in part on the change in vector of a third harmonic of the spindle, a twelfth harmonic of the spindle, or both.

19. A non-transitory computer-readable medium having processor-executable instructions stored thereon that, when executed by a processor operably connected to a storage device, cause the processor to:

determine a vector of a harmonic other than a first harmonic of a spindle of the disk drive;

compare the determined vector to a stored vector of the harmonic other than the first harmonic to determine a first vector change, wherein the determined first vector change is a change in magnitude, a change in phase, or a change in both magnitude and phase;

compare the first vector change to a threshold; and upon determining the first vector change satisfies the threshold, calculate a change in a magneto-resistive (MR) jog offset for a read/write head of the disk drive.

20. The computer-readable medium of claim 19, the processor-executable instructions, when executed by the processor, further cause the processor to:

determine a correction profile based at least in part on the calculated change in MR jog offset for the read/write head; and compensate for MR jog offset direct current (DC) drift based at least in part on the determined correction profile.

* * * * *